G. P. EVERSON.
MEANS FOR DEMONSTRATING STELLAR POSITIONS AND INFLUENCES.
APPLICATION FILED JUNE 12, 1916.
1,301,046.
Patented Apr. 15, 1919.
4 SHEETS—SHEET 2.
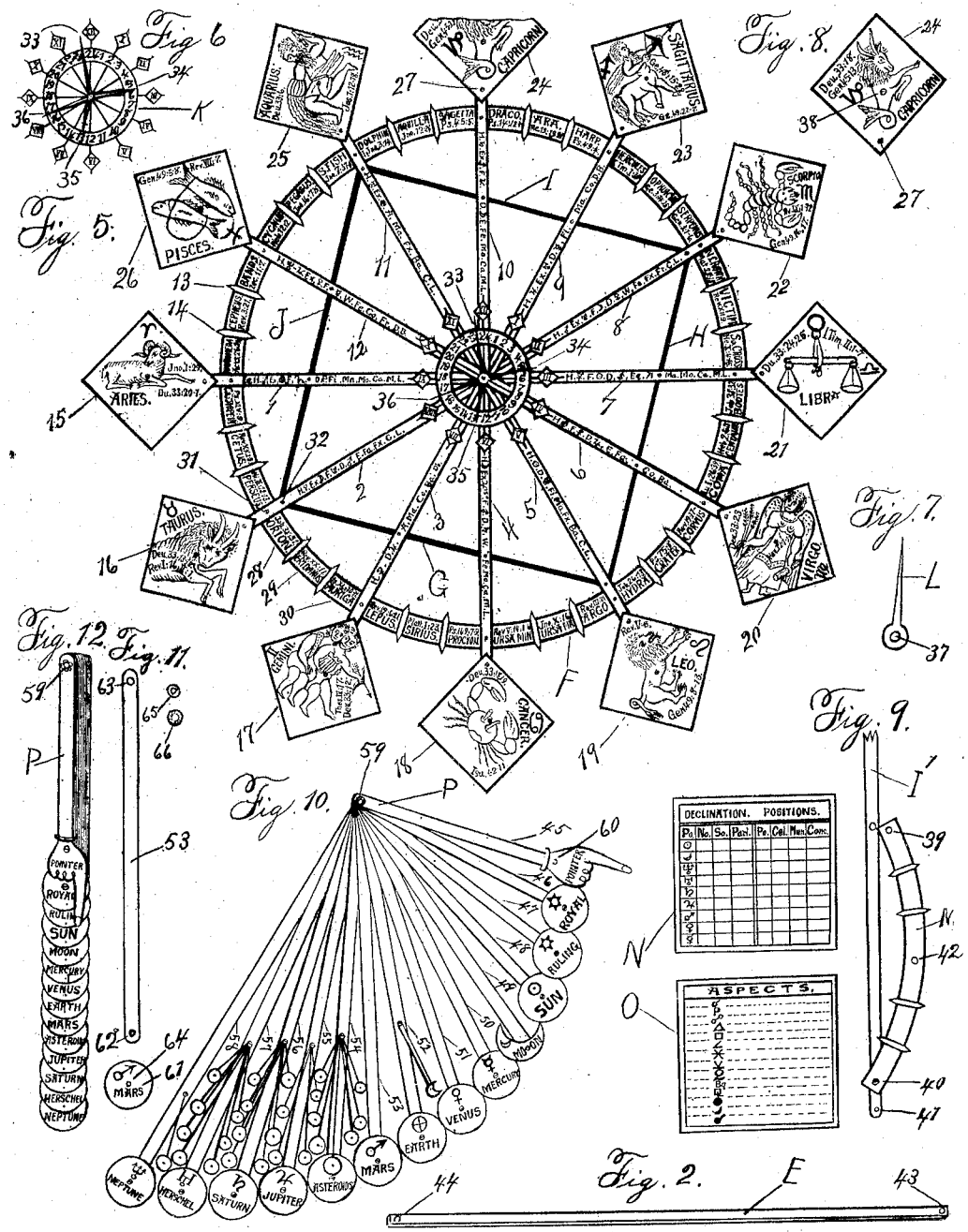
INVENTOR.
Genevieve Price Everson
T. V. Maxedon
ATTORNEY.

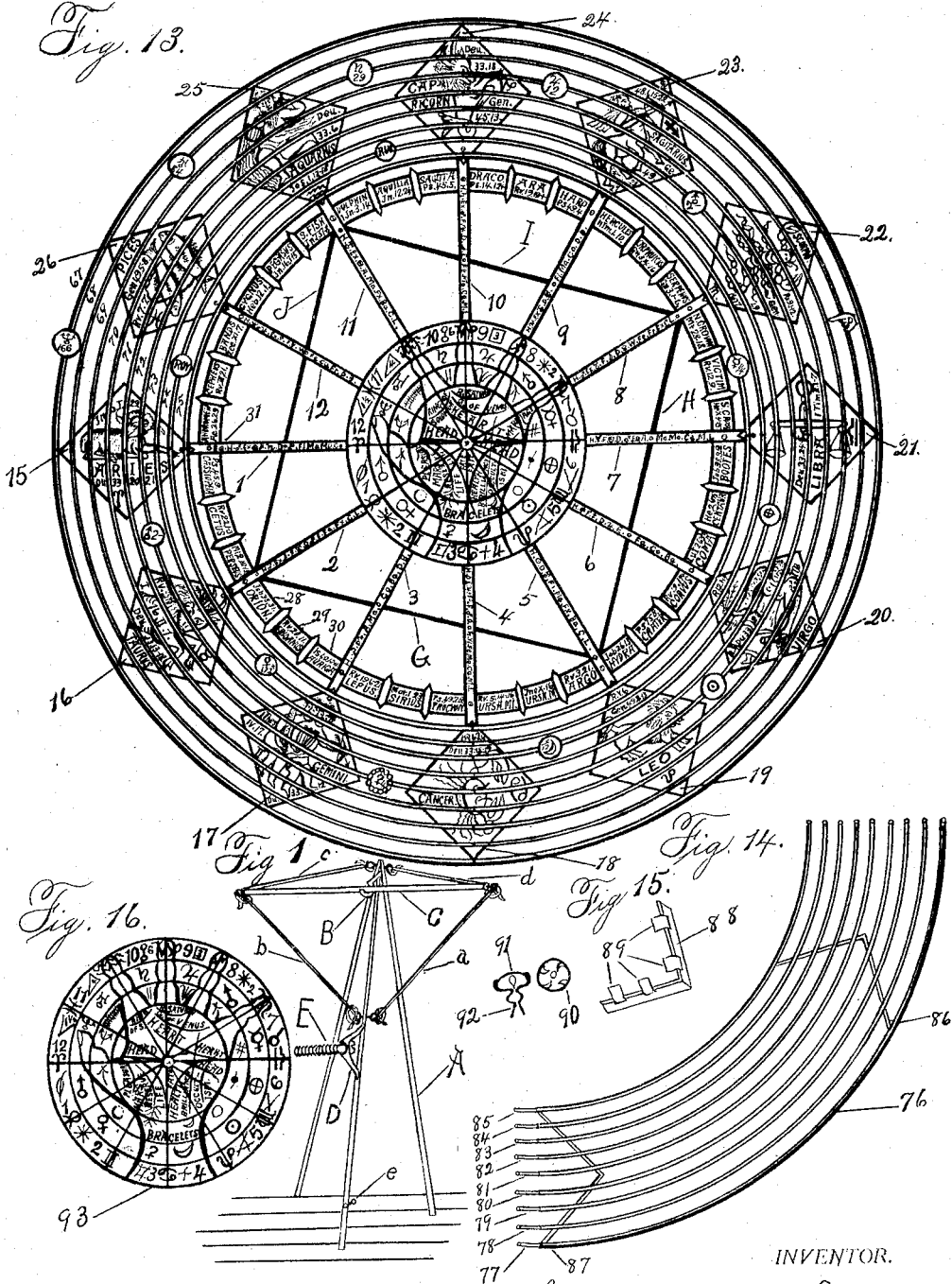

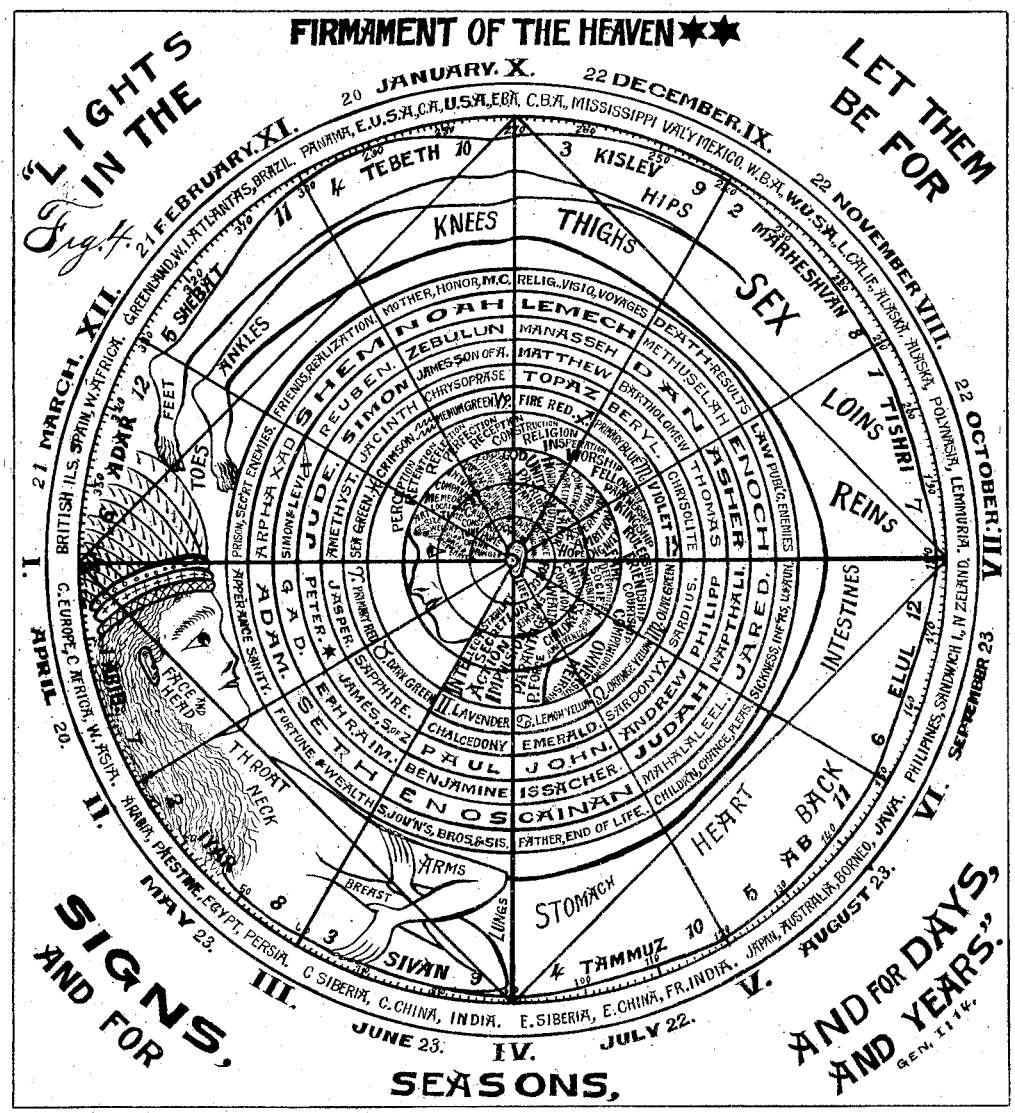

UNITED STATES PATENT OFFICE.

GENEVIEVE PRICE EVERSON, OF CINCINNATI, OHIO.

MEANS FOR DEMONSTRATING STELLAR POSITIONS AND INFLUENCES.

1,301,046.            Specification of Letters Patent.      Patented Apr. 15, 1919.

Application filed June 12, 1916. Serial No. 103,071.

*To all whom it may concern:*

Be it known that GENEVIEVE PRICE EVERSON, a citizen of the United States, residing at Cincinnati, in the county of Hamilton and State of Ohio, has invented new and useful Improvements in Means for Demonstrating Stellar Positions and Influences, of which the following is a specification.

My invention relates to charts and globes and other such means of demonstrating the relative position of the heavenly bodies with each other and also with the earth.

The objects of my invention are to afford means: (1) for interpreting and elucidating scriptural references to the heavens; and (2) for deducing from the relative position of the heavenly bodies with each other and with the earth important facts touching the physical, mental, and spiritual aspects of human nature.

I accomplish these objects by means of the mechanism hereinafter described and illustrated, in which illustrations like reference characters represent like parts in all figures in which it appears advisable to use the same.

Figure 1 is a perspective view of a movable, portable, tripod stand adapted to support my invention for demonstrating and lecturing purposes.

Fig. 2 is a detached perspective view of a support or brace used in connection with said tripod stand.

Fig. 3 is a plan view of the zodiac as drawn and illustrated by the ancients.

Fig. 4 is a cross-section of the earth taken on the equator with certain matter, for the sake of convenience, illustrated on the face of the section. This figure is what I call the mundane sphere.

Fig. 5 is a vertical cross-section of the zodiac and the polar star which is supposed to be in the center of said zodiac. This figure is what I call the celestial sphere.

Fig. 6 is a side elevation of a combined solar and sidereal time indicator.

Fig. 7 is a detached, side elevation of one of the pointers or hands of said indicator.

Fig. 8 is a detached, plan view of one of the zodiacal signs of Fig. 5, the same being Capricorn.

Fig. 9 is a detached plan view of a section of the rim and one of the radii of Fig. 5, and also of two small blackboards used in connection with my invention.

Fig. 10 is a detached, plan view of a number of disk-tipped arms used in connection with Fig. 5.

Fig. 11 is a detached, plan view of one of the arms, one of the disks, one of the washers and a nut of Fig. 10.

Fig. 12 is a detached, perspective view of the arms of Fig. 10 shown in a folded condition.

Fig. 13 is a modification of Fig. 5.

Fig. 14 is a detached, plan view of a section of the circular tubing, overlying the zodiacal signs of Fig. 13.

Fig. 15 is a detached perspective view of one of the supports of Fig. 14 and a plan view and vertical section of a movable colored, illuminated crystal used in connection with the circular tubing of Fig. 13.

Fig. 16 is a plan view of the palm and fingers of the human hand.

In Fig. 1, A is said tripod stand. B is a support, attached to and extending horizontally from the upper end of said stand, said support having an off-set and curved free end adapted to receive and support pole C. D is a U-shaped clip attached to the front leg of said stand, said clip having through the arched portion thereof a perforation adapted to receive the bolt-shaped spindle E, which, in its turn, is adapted to receive thereon and support the various parts of my invention, and, in addition thereto, to receive thereon, by means of the perforation therethrough, either end of the support as shown in Fig. 2 and the nut 66 as shown in Fig. 11, the perforation through the other end of said support being adapted to receive the thumb-screw *e* which is adapted to firmly bind the lower end of said support to the front leg of said stand, said support being adapted to steady and support said spindle and the various parts of my invention when mounted thereon. *a* and *b* are one set of strings having their upper ends securely attached to screw eyes in the ends of said pole and having their lower ends tied into other screw eyes attached to the front leg of said stand. *c* and *d* are another set of strings having one of their ends securely attached to said screw eyes in the ends of said pole and having their other ends tied into other screw eyes attached to the upper end of said stand, both sets of said strings being adapted to steady said pole and prevent it from falling off of said stand endwise, said pole being adapted to receive and have wound or rolled thereon the map or chart bearing said mundane sphere of Fig. 4, all of said strings being further adapted to bind and firmly hold said map to said pole when wound or rolled thereon.

In Fig. 2, E^x is the support for the spindle above described, said support having in its ends the perforations 43 and 44, the one being adapted to receive said spindle E, and the other being adapted to receive said thumb-screw e.

In Fig. 3, the large lettering at the top, bottom and on the right side of the figure are short scriptural references to the heavens, each of which is accompanied with its proper citation. This figure is a map of a portion of the heavens, representing by pictures and on a flat surface the original 48 constellations constituting the sacred zodiac, the celestial grand man. This zodiac is of the greatest antiquity, its origin being entirely unknown to profane history, and is presented here without any alterations whatever. It is one of the special features of my invention to demonstrate and prove by sacred history and sacred chronology not only the origin of this wonderful map, but also that the sacred zodiac drawn thereon is a matchless, primeval, hieroglyphical exposition of the plan of God in the ages. I do not desire to make this sacred zodiac a part of the record in this case because I claim any invention therein, but because of the marvelous connection it has with what I do claim as my invention, a part of which, as it pertains to this map, is the process of teaching scriptural truths. This map is simply an ordinary hanger and is adapted to be suspended and displayed from any ordinary nail or hook attached to the wall of the room or to any suitable support on a stage, where a demonstration or lecture is being given.

In Fig. 4, the large lettering placed at the top and bottom and in the corners of the square encompassing the figure is an abbreviated passage from the scripture accompanied by the proper reference thereto. It does not seem necessary or advisable to employ the usual reference characters in describing this figure which I call the mundane sphere. The ordinary calendar months arranged in their order and in agreement with the zodiacal signs are placed on the outside of the circumference of this figure. The 360 degrees and twelve signs common to all circles are marked on its inside. The square drawn in this figure, having its corners at the Roman figures I and VII, IV and X, is called the mundane sphere and is a feature I claim to be new and useful. It serves three purposes; (1) geographically considered, it locates points of the earth corresponding to the present cardinal signs of the zodiac; (2) astronomically used in connection with the "360 degrees and twelve signs," it becomes an accurate and ever ready reckoner of longitude and time, simplifying by demonstration that branch of mathematics; point I representing longitude nothing or meridian Greenwich, point VII representing longitude 180 degrees west or "international date line," point IV representing latitude 90 degrees south, point X representing latitude 90 degrees north; and (3) astrologically considered, it definitely locates the four most powerful houses, namely, "I Beginning of Life," "X Honor," "VII Law," "IV End of Life," permitting of an instantaneous grasp of the importance of these houses, signs and planets occupying them in considering any map of the heavens. The seeming contrary arrangement of east and west points is also designed and obviates the usual confusion attending comparisons of terrestrial and celestial maps.

The twelve sections or houses astrologically so called of this mundane sphere represent crosswise sections of the earth, having 30 degrees of longitude and 180 degrees of latitude. Beginning with the diameter or meridian numbered I at its eastern extremity, and computing eastward, we have, in this circle of 360 degrees, twelve consecutively numbered meridians, called in this connection "the cusps" or beginnings of the succeeding 30 degrees (sign of the circle) or section of the earth or mundane house. These "cusps" and sections correspond to the twelve corresponding numbered meridians or "cusps" of the twelve sections or signs of the zodiac, each mundane section being subject to the influence of the zodiacal sign or section of like number. This system is scientifically determined by what is astronomically called the "radical position of the zodiac" which occurs annually at the vernal equinox when the sun is said to enter the first point of the first zodiacal sign Aries, which sign at that date holds the "ascendent" or "I mundane house" at sunrise—the days and nights being equal and the cardinal signs being alined with the cardinal points of the earth.

It is to be noted that there are twelve circles in this figure. Counting from the center of the figure, the first four circles inclose matter pertaining to the human head, described hereafter. The farthest circles from the center, which are the eleventh and twelfth, inclose between them the names of certain countries, nations of the earth, which names contain the following abbreviations; "C" for central; "W" for west; "E" for east; "Fr." for farther; "I" and "Ils." for islands; "N" for new; "W. I." for West Indies; "C. A." for Central America; "E. B. A." for East British America; "C. B. A." Central British America; "U. S. A." for United States of America; "E. U. S. A." for East United States of America; and "L. Calif." for lower California.

Inclosed between the tenth and eleventh circles is a figure called the microcosm, the terrestrial little man, herein used to represent mankind individually and collectively; an appropriate figure, whereby the peculiar relation which each 30-degree-section of the earth, as well as the peculiar relation which each twelfth section of the human body, has with certain numerically designated signs of the zodiac, is portrayed and demonstrated, the sections of the earth being partly named in the inclosed space between the eleventh and twelfth circles, while the names of the twelve sections of the human body are placed in their natural order on the human figure, with the seeming exception of the word "heart" in section five.

On the human figure is also placed the names of the Hebrew months in alinement with the ordinary calendar months to which they correspond, as "Abib" (April) and so on; also, numerals in sets, as "1—7", "2—8", and so on, the first numeral of each set denoting the number of the month in the Hebrew ecclesiastical year, and the second of each set denoting the number of the month in the Hebrew civil year, as "Abib" which was the first month in the ecclesiastical year and the seventh month in the Hebrew civil year. Inclosed between the ninth and tenth circles are words denoting social, physical and spiritual conditions of mankind taken both individually and collectively, which words contain the following abbreviations; "S. Jou'n's" for short journeys; "Bro. & Sis." for brothers and sisters; "Child'r." for children; "Pleas." for pleasure; "Inf'rs." for inferiors; "U. & Aun." for uncles and aunts; "Secr't." for secrets; "M. C." for meridian culmination; "Relig." for religion; "Visio." for visions; and "Publ'c" for public. Inclosed between the eighth and ninth circles are the words "Adam" and the names of certain ones of his descendants, eleven of whom are ante-diluvian patriarchs, and one of whom is a post-diluvian patriarch. Inclosed between the seventh and eighth circles are the names of the twelve children of Jacob and Joseph, who are the twelve founders of the natural kingdom of Israel and the earthy Jerusalem. Inclosed between the sixth and seventh circles are the names of the twelve apostles of Jesus Christ, which apostles are the founders of the spiritual kingdom of Israel and the heavenly Jerusalem ("the four and twenty elders" of Revelations).

Inclosed between the fifth and sixth circles are the names of the twelve jewels garnishing the twelve foundations of the new Jerusalem, prefigured by the twelve stones in the breast plate of the Jewish high priest. Inclosed between the fourth and fifth circles are the symbols of the twelve signs of the zodiac, which signs rule the houses in which they are placed; the names of the element colors red, green, purple and blue; and the names of the colors produced by the scientific blending with said element colors of the colors of the planets ruling the various signs of the zodiac, as the color of Leo, whose element color is red, being the planet house of the sun, the blending of the gold of the sun with the red of the sign gives orange yellow; see section V.

Having thus given a casual description of this figure as it pertains to the subject matter contained between the circles, or, in other words, having described it circumferentially, I will now describe more fully and by illustration of the whole that portion of it (the second house) which is inclosed by meridians II and III, which is a description radially. Commencing at "meridian I", longitude nothing, and passing eastward over the first 30 degrees of longitude or one thousand eight hundred geographical miles of the earth's surface, we find that the meridian near Cairo, Egypt, is the thirtieth degree east, hence, the "cusp" or beginning of the "second house" now being described, which house corresponds to the second zodiacal sign, Taurus or Te, meaning "foundation." The significance of all this becomes apparent, when we learn that astronomers and savants are agreed that the star Alcoyne of the Pleiades, a group of this sign, is the center around which our solar system is revolving, and that the great pyramid of Geheza on this thirtieth meridian was orienated by this star and builded in commemoration of that period when the vernal equinox occurred in this sign, Taurus. This period of time, calculated by the "precession of the equinoxes" and computed by Bible chronology, was about 2170 B. C. The Hebrew and Arabic meaning of the name "Alcoyne" is the center, the foundation, or the base. The Latin word for the Pleiades is Vergiliae, or "Stars of the Spring" while the Hebrew name for the entire group is "Chima", the Cumulus, or "Rolled Around"; these facts pertaining to this second sign are also relative to this second mundane house which also was once the cardinal section of the earth, the historical center and cradle of the human race, and recent surveys have demonstrated that the great pyramid of Geheza, latitude 30 degrees north and longitude 30 degrees east, marks the center of the land areas of the earth. This can be easily verified by any Mercator map or terrestrial globe.

In this section inclosed between circles eleven and twelve are the names of certain countries anciently famous, namely, Arabia, Palestine, Egypt and Persia. These and many others north and south of the equator, together with their adjacent waters, constitute that section of the earth, especially influenced by this second sign, Taurus, and a superficial examination of this section will show that the names, customs, rites and ceremonies of these nations prove that they have felt this influence and, perhaps, intuitively appropriated their starry allotments, "which the Lord God hath divided unto all nations under the whole heavens." Deut. 4; 19.

In this second section of the heavens we have the sign, Taurus. On the earth in this second section, we have the Taurus mountains and many countries where Taurus, or Apis, the bull, was, and is, the object of idolatrous worship, and other countries where the bull was used as a sacrifice, or substitute. Leviticus 4; 1, 5. We also find the country or region anciently known as Chersonesus Taurica where dwelt the Sythian race Tauri from whom is descended the modern Saxon or John Bull. The modern name of this region is "the Crimea", a corruption of the Hebrew "Chima", the Rolled Around. In the sign, we find the constellation of Perseus the mighty warrior who holds triumphantly the cut-off head of Medusa. On earth we find the anciently great Medo-Persia, famous in history and noted for great world conquerors, such as Nebuchadnezzar, Cyrus, Darius and Alexander the Great (Greek). In the sign, also, we find the constellation of Orion, the exterminator of the dragon, and on earth in Egypt we find the worship of Osiris, or Orion. In the sign we find the constellation of Eridanus, or "waters of judgment", and on earth we find many waters noted for decisive events in both ancient and modern times, such as the Euphrates and Jordan rivers, the Dead and Red seas, all inseparably connected with God's judgments, the Nile whose annual overflow decided so much for the inhabitants of its valley, the Suez canal deciding so much for present day civilization.

In astronomical anatomy this house and sign rules the throat, neck and shoulders of the microcosm and exerts an influence for strength, push, determination and patient perseverance, obedience and power of the human voice.

In astrological calculations it pertains to acquired wealth and is judged for these matters according to the sign holding it and planets occupying it in any map of the heavens. The "blessings of fruitfulness" and "powers of substitutiton" occupy this house and sign by reason of divine command. Gen. 48; 14, 20; 49; 22, 27. Deut. 33; 13, 18.

The third son of Adam, Seth, meaning "put", is placed in this section, he being the first in the line of Bible genealogy from Adam, the head, who is placed in the first house, Aries, he being the radical head of the human race. Gen. 5; 1, 4. Seth was "put" for Abel whom Cain slew (Gen. 4; 25), this being the first recorded instance of "substitution because of sin", thus introducing the central thought of the teachings of this sign, which, in a spiritual sense points to the "substitution of Jesus Christ as the sin offering of the world", while, in the afflicted sense, the "power of substitution" becomes debased into "supplanting", which feature is also developed in the teachings of this sign; thus Ephraim, meaning double fruitfulness, the second son of Joseph, whose name is placed in this section, was "put" or substituted, by his grandfather, Israel (Jacob); (1) for Joseph, his father; (2) for Manassah, his own elder brother; (Gen. 48:14, 20); thus, to him was given not only the "power of substitution", signified by the name Israel, but also the feature of "supplanting" signified by the name Jacob, and the added fruitfulness, signified by the name Joseph. Gen. 27; 33, 36, also, 29; 21, 31. He, in his turn, exemplified these features when he became the richest and most numerous of the tribes, eventually substituting Samaria for Jerusalem and supplanting Judah as the King of the Ten Tribes.

Placed in this section is, also, James, the son of Zebidee, meaning "the gift of Jah", who is the apostle of Jesus Christ, whose name (James) and jewel accords with this section, James in Hebrew meaning the same as Jacob, that is supplanter.

The jewel assigned to this house is the sapphire meaning number. It is mentioned in Rev. 21; 19 as the garnishing stone of the second foundation of the new Jerusalem, its meaning and divers beautiful colors fittingly representing the "multitude of nations" and "numberless blessings", given to Jacob and by him placed on the head of Joseph, who was "separated from his brethren". Gen. 37; 3; also, 49; 22, 27.

We now come to the astronomical symbol of the sign Taurus and the words "dark green", Taurus being a sign of the earthy triplicity, the element color of which is green and the ruling planet of the sign which is Venus, and whose color is a pink or rose red and so the blending has very little effect on the element color.

In like manner as we have demonstrated by our description of this radial section, there is a deep, fundamental thought with three applications, namely, physical, mental and spiritual, more or less applicable to mankind, individually and collectively, to be found in every section of this figure.

We now come to the human head filling the circular space from the center to the fourth circle, which we will now describe.

I claim to have discovered and to have invented a mechanism for demonstrating; (1) that the principle of the "law of polarization" and "law of orientation" operating on all planes of celestial activities are also operating on all planes of terrestial activities, and that a knowledge of these facts and a correct application of these laws constitute the only reliable foundation on which an exact human science can be built.

This explains the presence of the human head occupying the center of Fig. 4 with its several faculties grouped in the proper descriptive " mundane house " and classified by the corresponding zodiacal sign of Fig. 5, which sign, by the operation of the laws of polarization and of orientation, I have discovered to be the cause of the existence of such faculties and propensities of the human mind and consequent expressions on the human face and elevations on the human skull.

The map or chart on which this Fig. 4 is placed is adapted to be rolled upon pole C of Fig. 1, which pole supports said map or chart, the small circle in the center of the figure being adapted to receive said spindle E which partially supports said map or chart and gives desired alinements of Fig. 4 with other figures of my mechanism.

I claim that the human head, being the first house, or ascendant section of the microcosmic body, has a radical or primary position, determined by the laws of polarization and orientation, and, when scientifically positioned, as in Fig. 4, it is to be synthetically considered, as it corresponds in power and shape to the circle of the zodiac and rules the entire body by means of the nervous system.

By referring to Fig. 4, it will be seen that meridian I (cusp I) of the first house at its eastern extremity is the " line of perception " to the human head—the first conscious faculties of the mind. While the western extremity or meridian VII designates the balancing section of the head in full accord with the " loins and reins," the balancing sections of the microcosm. This orienating meridian is called in this connection " the line of equilibrium " and is especially subject to the pull of gravity and the disintegrating forces of nature. It divides the head as well as the body into northern and southern hemispheres, while meridian IV at its southern extremity and X at its northern extremity divides both into eastern and western hemispheres. This perpendicular meridian is called in this connection the " line of erection " and is especially influenced by the law of polarization and the constructive force of nature. It polarizes the microcosm and, being identical with the spinal column, it causes him to stand upright. It is intersected by the line of equilibrium in the region of the loins or " balances." It collects and transmits by means of the brain and spinal cord the life force constantly emanating from the celestial poles. By reason of this infusion of the higher life, man, the higher animal, is enabled to withstand the pull of gravity and resist the destructive forces of nature and walk upright before his Creator physically, mentally and spiritually, having his greatest extent therein, latitudinally, in contradistinction to the lower animal whose head, being less circular, hence appropriating a less amount of zodiacal influence, has his greatest extent longitudinally, his spinal column corresponding to the line of equilibrium; and so he walks horizontally before his Creator, with his entire length subject to the pull of gravity and the disintegrating forces, having very little if any infusion of the life from the celestial poles, hence he is short lived, of small mentality and undeveloped spiritually.

In Fig. 5, F is the rim of a wheel made of metal or any other suitable material. This rim is adapted to being knocked down into six equal sections. 1 to 12 inclusive are the radii of six diameters which intersect each other in the center of the wheel. 13 and 14 are two of 24 flange-like dividers of said rim. 15 to 26 inclusive are small sign blackboards, illuminated by any suitable means, on which are placed in suitable colors the pictures, symbols and names of the twelve signs of the zodiac, the grand man with Bible references thereto. These twelve signs partake of the nature of the four natural elements, namely, fire, earth, water and air, each element having an individual color, each color having three signs, each sign having a shade of intensity of that individual color, said intensity of color (and the sign having it) being named " fixed," " common " and " cardinal " respectively. These constitute what are called the element triplicities and are:

*Fire triplicity (element color red).*

Aries — cardinal — medium red; Leo — fixed—primary red; Sagittarius—common—orange red.

*Earthy triplicity (element color green).*

Taurus—fixed—dark green; Virgo—common—olive green; Capricorn—cardinal—medium green.

*Watery triplicity (element color blue).*

Cancer — cardinal — medium blue; Scorpio—fixed—dark blue; Pisces—common—marine blue.

*Air triplicity (element color purple).*

Gemini—common—lavender; Libra—cardinal—violet; Aquarius—fixed—purple.

The cardinal signs are the present cardinal points. I call them the mundane leaders, abbreviated " M L." 27 is one of 24 similar small bolts that bind blackboards to the outer ends of said radii. 12 of these bolts are shown in this figure and one of those not shown in this figure is seen at the center of Fig. 8. 28, 29 and 30 are the names of the three constellations called "decans" (meaning 10 degrees) that belong to the second zodiacal sign, Taurus. In the same manner each sign has its "decans" named on the rim of the figures within the proper section. Each of these "decans" is accompanied by Bible references thereto. 31 is one of 12 similar bolts adapted to bind said radii to said rim. The sectional divisions of this rim can best be explained in the explanation of Fig. 9. G, H, I and J are the four sides of what I call the celestial square. 32 is one of 12 similar bolts that bind said square to said radii. This figure is what I call the celestial sphere, and, for the same reason that important matter was placed on the face of the section in Fig. 4, important matter is placed on the face (radii) of the section in this figure. The clock-like mechanism at the center of this figure is not a fundamental part of this figure, but is a separate and independent device, although it is used in connection with the figure. The small circle at the center of this figure is a perforation adapted to receive spindle E of Fig. 1, on which it is mounted and revolves. The subject matter placed on the radii of this figure has the following abbreviations, not mentioning the signs of the zodiac, the sun, moon, symbols of said signs and the planets: "Ex." for exaltation; "F." for fall; "D." for detriment; "Fi." for fiery; "Ma." for masculine; "Mo." for movable; "Ca." for cardinal; "Eq." for equinoctial; "E." for earthy; "Fe." for feminine; "Fx." for fixed; "Fr." for fruitful; "C. L." for celestial leader; "A." for airy; "Co." for common; "Ba." for barren; "D. B." for double bodied; "W." for watery; "M. L." for mundane leader.

The subject matter on radius 1 reads as follows; "The planet house of Mars. The exaltation of the Sun. Fall of Saturn. Detriment of Venus. Fiery. Masculine. Movable. Cardinal. Mundane leader."

The subject matter on radius 2 reads as follows; "The planet house of Venus. Exaltation of the moon. Fall of Herschel. Detriment of Mars. Earthy. Feminine. Fixed. Celestial leader." In like manner the subject matter of every radius reads.

We will now explain what the matter on radius 2 means as this matter was that which we considered heretofore radially. "The planet house of Venus" means, that this second sign, Taurus, is of a similar nature to that of Venus, that is, the things that are represented by Venus are also represented by Taurus. "Exaltation of the Moon" means, that this satellite in certain positions comes to represent practically the same thing as Venus. "Fall of Herschel" means, that Herschel being masculine, scientific and occult in his nature and at home in the airy sign of Aquarius is in square to his true position and out of his element in this earthy sign of Taurus. "Detriment of Mars" means, that Mars being fiery, energetic and impulsive in his nature and at home in the fiery, impulsive sign of Aries forms no aspect to his own true position and is out of his element in this fixed, plodding sign of Taurus. "Earthy" means, partaking of the nature of the ground. "Feminine" means, receptive and fruitful. "Fixed" means, strong, satisfied and immutable in the proper element. "Celestial leader" will be fully defined hereinafter.

The square marked on this figure having its points at the sign pictures Taurus, Leo, Scorpio and Aquarius, is called the celestial square and is a feature of my invention, the use of which I claim to be new, instructive and useful. In my mechanism it has three distinctive uses as follows: (1) it becomes, by dividing the circle into four 90-degree sections or arcs, a ready reckoner of the aspects and an infallible index to the positions and parallels of the signs and planets occupying them, so that a quick and accurate perception of these factors is always at hand—a fact of prime importance in all astrological calculations; (2) by connecting the "fixed" or more powerful signs of the "element triplicities," namely, Taurus (earth), Leo (fire), Scorpio (water) and Aquarius (air), it specializes the ancient cardinal points of the heavens as they stood before the equinoxes had passed to their present position. I claim this use to be of great value in teaching astronomy, in demonstrating the "precession of the equinoxes," and in dividing and locating the 30-degree sections of the earth; and (3) by emphasizing the scripturally recognized zodiacal leaders, it supplies both cause and reason for scriptural dates and records and gives valuable aid in elucidating various portions and texts of the Scripture referring; (1) to history and prophecy (as Dan. and Ezra); (2) to genealogy (Gen.; 5 Math.; 1; (3) to chronology (Gen.; 7. Luke; 1); (4) to geography (Gen.; 10. Joshua); and (5) to zodiacal enigmas (Ezk.; 1 and 10. Isa.; 6. Num.; 2. Rev.; 4 and 20).

In Fig. 6, K is the indicator. 33 and 34 are the hands that indicate solar time. The small circle at the center of this figure is a perforation adapted to receive tightly spindle E of Fig. 1, on which spindle it is adapted to be mounted and to rotate. Solar time is measured in Roman characters, and sidereal time in ordinary numerals. This device is independent of, but is used in connection with, Fig. 5.

In Fig. 7, L is the pointer. 37 is a perforation in the spindle end of the pointer, which perforation is sized so as to fit sufficiently tight on said spindle to enable it to stand wherever it may be set.

In Fig. 8, 24 is the blackboard. 10 is the radius to which said board is attached by means of the bolts 27 and 28. 38 is one of the 12 similar bolts not shown in Fig. 5.

In Fig. 9, M is a section of the rim F of Fig. 5 extending from radius 1 to radius 3. 1' is a detached portion of radius 1 of Fig. 5. 39 and 40 are perforations in the ends of said section. 41 is a perforation in the end of said detached portion of said radius. 42 is a perforation centrally positioned in said section. Perforations 40, 41, and a similar perforation in the Aries end of the section of said rim of Fig. 5, aline, one with the other, and bolt 31 is adapted to enter and pass through all of these alining perforations and bind them securely together. A bolt similar to 31 is adapted to enter and pass through perforation 42 and an alining perforation in the end portion of radius 2 and bind said radius firmly to said section. In a similar manner, all the sections of said rim and all of said radii are fitted and bound together in one symmetrical whole as per Fig. 5. And it is in this manner, also, that said wheel of Fig. 5 is adapted to being knocked down for convenience in moving from one lecture room to another and also for shipping from one place to another. N and O are two small blackboards used in connection with my invention. Board N is adapted for use in taking thereon a summary of the declinations of the various planets to the ecliptic and also of their relative positions in the heavens. Running across the top of board N and within the boxheads, "Po." means position; "No." means north; "So." means south; "Parl." means parallel; then again, "Po." means position; "Cel." means celestial sign; "Mun." means mundane house; and "Conc." means conclusion. Running from top to bottom along the left side of said board and in the order named are symbols of the sun, moon, Neptune, Herschel, Saturn, Jupiter, Mars, Venus and Mercury. Board O is adapted to receive thereon the markings of the distances of one planet from another, said distances being called "aspects." Running from top to bottom along the characters written on said board to denote "aspects"; the first character means, conjunction (no degrees); the second, parallel (equal number of degrees); the third, opposition (180 degrees); the fourth, triangle (120 degrees); the fifth, square (90 degrees); the sixth, semi-square (45 degrees); the seventh, sextile (60 degrees); the eighth, semi-sextile (30 degrees); the ninth, quintel (72 degrees); the tenth, biquintel (144 degrees); the eleventh, sesquiquadrate, (150 degrees); the twelfth, eclipse; the thirteenth, crescent; and the fourteenth, ocult sign. It is from the facts indicated on these boards that purely scientific deductions are had which I call classical readings.

In Fig. 10, P is the group of arms and their attachments. 45 to 58 inclusive are said arms taken individually. 59 is a bolt which represents spindle E of Fig. 1. 60 is one of 14 similar bolts adapted to bind the several disks, the crescent and the hand to the free ends of said arms. Each disk crescent has placed on it the name and symbol of the thing they represent. All of the planets, the asteroids the moon and the sun are represented by these disks. Such planets as have moons have rotatably attached to them secondary arms adapted to fold onto said first mentioned arms and disks representing these moons. This group of arms with their attachments are used in connection with Fig. 5 only, spindle E taking the place of bolt 59.

In Fig. 11, 53 is the arm. 61 is the disk. 62, 63 and 64 are perforations. 64 is adapted to aline with 62, and a bolt as 60 is adapted to bind said disk and said arm firmly together. 65 is a washer adapted to be mounted tightly on said spindle E and somewhat tighter than said arms and is in that way adapted to not only separate each arm from the other, but also prevent each arm from contacting the other and carrying it with the first mentioned when set at any desired point on Fig. 5. 66 is a nut adapted to run onto the threads of said spindle E and hold loosely said arms on said spindle.

In Fig. 13, the reference characters that are common to this figure and Fig. 5 refer to the same parts in each figure. 67 to 75 inclusive are concentric circles of tubing overlying the blackboards 15 to 26 inclusive to which they are attached in a way best described in Fig. 14. The human hand in the center of this figure, being separate and independent, but used in connection with this figure, forms no fundamental part of the figure itself. The small circle at the center of this figure is a perforation and adapted to receive spindle E of Fig. 1, on which the chart or map on which this figure is placed is adapted to be mounted and to rotate. This difference between this figure and Fig. 5 is in the means employed for positioning the heavenly bodies and the pointer as shown in Fig. 10. At various points on said tubing are seen 15 movable, colored, illuminated crystals or bulbs as shown in Figs. 13 and 15, on the faces of all of which except the pointer are placed the number of satellites and the symbols of the heavenly bodies they represent, and on the faces of all of which except the pointer and the sun is placed ordinary numerals which indicate the time required by each of these bodies to make one revolution around the sun, the time being indicated in terms of the time required for the earth to make one revolution around the sun.

In Fig. 14, 76 is a section of all the tubes of Fig. 13. 77 to 85 inclusive are fillers fitted and secured in the hollows of one end of said tubes and of the same diametrical sizes as said hollows. The hollows in said tubes at the other ends thereof are left open. 86 and 87 are braces or supports to which said tubing is securely attached by any suitable means. This section is, as if from radius 1 to 4 inclusive.

In Fig. 15, 88 is one of said braces of Fig. 14, showing the lugs 89 on one edge thereof and the width of the brace. Said tubes are attached to the edge of said brace opposite said lugs, which lugs are adapted to slide underneath and engage the edges of said blackboards of Fig. 13, when said section is put in place on said blackboards. The width of said braces hold said tubes a little way above said blackboards. The fillers in one set of ends of said section are adapted to fit into and enter the hollows of another set of ends in another section next adjoining it. The different sections and parts of Fig. 13 are best assembled and put in place on a table or floor, said tubes, in order to be enabled to place the last section thereof, is best assembled apart from said wheel of Fig. 13, and then, by placing it on said wheel and by giving it a spiral turn, said lugs slip into their places under the edges of said blackboards, and a small screw passed through any one of said lugs and into any one of said blackboards will hold and secure said tubing to said wheel. 90 is a plan view, and 91 is a vertical section, of one of said movable crystals. 92 is a spring clamp attached to the lower face of said crystal by any suitable means. By means of the diverging point of said clamp, said crystal is enabled to slide onto and clamp any one of said tubes and at any point thereon, and by means of the angular formation of the clamping portion of said clamp, said crystal can be removed from said tubes by pulling it outwardly.

In Fig. 16, 93 is the human hand. Elsewhere herein I have stated my claims in a general way regarding the discovery of the operation of certain laws on the aforesaid microcosm the little man. I have demonstrated the operation of said laws on said microcosm circumferentially, radially and perpendicularly, and have, in doing so, specialized on the human head. I will now specialize on the human hand to which I will apply the same laws through and by means of that branch of human science called chiromancy.

I claim, by reason of the operation of the law of polarization and orientation on all terrestrial planes, that the human hand, being the chief executor of the mind and marker of the latitudinal and longitudinal limits of the human body, is, so to speak, a projected head, and, scientifically considered, is an elongated, hollow sphere, having an axis and equator and executive force corresponding to the governing head of the body, functioning it separately, but harmoniously. Stand with feet together. Face the north. Place the palms of the hands together and extend the arms to the perpendicular limit above the head, and it becomes obvious that the hands are separated into an eastern (or right) hemisphere and a western (or left) hemisphere by the same perpendicular "line of erection" which polarizes the body and divides the brain into like hemispheres or "lobes". This "line of erection" corresponds to meridian IV and X of Fig. 4. It is definitely marked in the majority of hands. It extends from the center base of the hand, near the wrist, to the base of the second finger. It is the so called "fate line" of palmistry.

Separate the hands and, with arms still extended, pass the hands, palm front, downward to the horizontal limit which, in the more symmetrical figures, is in line with the reins or balancing section of the body, and two facts become obvious; (1) that the hands have inscribed the circumference of a sphere, the north pole of which is in most cases about 16 to 18 inches above the head; and also that the equator of this sphere is the horizontal line of equilibrium which now is seen to divide the hands into a southern (or base) hemisphere and a northern (or philangic) hemisphere, and to divide also the body into two like hemispheres. This "line of equilibrium" corresponds to meridian I and VII of Fig. 4. It crosses the palm horizontally from a point on the outside above the thumb called the "head of the life line" to a point on the inside called the end of the heart line near the "percussion," intersecting the "line of erection", or "fate line", in the center of the palm is the so called "head line" of palmistry. By this natural application of the celestial laws of polarization and orientation, the hands are seen to be two resulting surfaces primarily identical, with radical lines corresponding one with the other, each palm a circular plane having 360 degrees and 12 signs with well defined cardinal points and resulting in 30-degree sections corresponding to the houses of Fig. 4, arranged and classified by the zodiacal signs and planets of Fig. 5, a representation of which is submitted in Fig. 16, reference character 93.

Returning to our "two facts" mentioned above, one of which we have already set forth—with arms still extended to the horizontal limit, pass the hands downward to a point between the feet on a line with the great toes, and it becomes obvious that the hands have inscribed the circumference of a hemisphere, the southern pole of which is the smallest point of contact with the earth, the end of the great toes; (and coming now to the second fact) and (2) that man, himself, is the axis and equator of a sphere, the circumference of which is his own "length of reach", and the metaphor of "man's sphere of action" has become a demonstrated fact and man is recognized as being, indeed, "fearfully and wonderfully made" in full accord with the celestial laws, being polarized, centered, sectioned, squared, hypothenated, crossed and circumscribed, a macrocosm or image of his Creator, the macrocosm of the universe.

The small circle at the center of this figure is a perforation, by means of which the map or chart on which this figure is drawn is adapted to be mounted on spindle E of Fig. 1. It also has the systematized form and sectional divisions of the other figures of my mechanism, but differs somewhat therefrom in that it represents, in an operative sense, both Figs. 4 and 5. In this figure, there are four circles. Counting from the center outward, inclosed between the third and fourth (outer) circles are the ordinary numerals indicating the numbers of the mundane houses of Fig. 4; also the various astronomical characters representing the zodiacal signs of Fig. 5 placed on the "cusp" of the corresponding mundane house; also beginning at the "cusp" of the first house, significator of the sign, Aries, and occurring in the six consecutively numbered sections are placed the natural characters found in the human hand, which corresponds in outline to the astronomical characters, indicating the planetary aspects, shown on board O of Fig. 9. Beginning at the "cusp" of the seventh section, significator of the sign, Libra, and occurring in the six houses consecutively numbered therefrom, are placed the astronomical characters indicating the aspects, with certain numerals adjacent thereto or inclosed within the character, which numerals indicate the number of degrees required to form an aspect. Thus, in section 8, sign Scorpio, is placed the astronomical significator of the "sextile" aspect, which is 60 degrees or two signs, separated, and in section 2, sign, Taurus, is placed the natural hand character resembling and called a star, which hand character very greatly resembles said astonomical significator.

Inclosed between the second and third circles are the astronomical significators of the sun and moon, the eight planets and the asteroids, each planet significator being placed in the section and sign to which it agrees in nature and influence.

Inclosed between the first and second circles are placed certain human hand characters in alinement with the zodiacal signs and planet significators that they resemble in outline. Thus, in the first section, sign, Aries, planet house of Mars, is the significator of Mars in alinement with the human hand character called the "dart".

Inclosed within the first circle is the palm of the left hand showing the polarizing and orientating meridians with resulting 30-degree sections and depicting and naming the lines commonly found in the hand, the abbreviation G meaning girdle and S meaning Solomon.

The combination of Figs. 5 and 10 is best adapted to small goods designed for mail or express delivery, while the combination of Figs. 3 and 4; 3, 4, 13 and 6; and 3, 4, 13 and 16; are best adapted for lecture purposes.

Having thus described my mechanism in detail and by illustrations, I will now describe it as a working mechanism.

For the purposes of a lecture, I position in any suitable place on a stage or in a room the tripod stand, Fig. 1. I next put in place on this stand the mundane chart (sphere), Fig. 4, which is partially mounted on and partially supported by spindle E, Fig. 1. I next mount on said spindle the celestial chart (sphere), Fig. 13.

For the purposes of private work, I exchange the above chart, Fig. 13, for the modification of said chart, namely, celestial chart (sphere), Fig. 5.

For the purposes of a lecture, I rotate said chart, Fig. 13, until Aries and Libra fall upon and aline with diameter I—VII of said chart, Fig. 4. By this position, the said chart, Fig. 13, occupies the radical position. I next mount on said spindle E the time indicator, Fig. 6. Having ascertained and having at hand the date (solar time) at which it is desired and necessary to build up and reproduce a map of the heavens, which time we will suppose is March 29, 1916, 10 o'clock a. m., for Philadelphia, Pa., U. S. A.

I next proceed to find the sidereal time corresponding to noon of that day. I find this by reference to my ephemeris. Then, by a simple calculation in longitude and time, I find this sidereal time, or right ascension, of the aforesaid meridian to be 22 hrs., 27 min., 00 secs. I next move the hands of said time indicator so that the shorter hands of said indicator indicate that hour of sidereal time, and the longer hands thereof indicate 10 o'clock a. m. solar time.

I next refer to my ephemeris to see what sign of the zodiac is on the eastern horizon, that is occupying the ascendant or first mundane house, at this exact hour and minute, and this I ascertain from the tabulated figures in said ephemeris called "Tables of houses." Using said tables for the meridian of New York (practically the same as that of Philadelphia) which is about 71 degrees west of Greenwich, we find that at the aforesaid time the 28th degree and 53d minute of the sign, Gemini is rising, or holding the cusp of the first house. I now turn said celestial chart slowly until the sign blackboard on which is pictured the constellation of the twins or Gemini, the third radical sign of the zodiac, is on the cusp of the first house or ascendant, marking at the same time on said blackboard "28 degress and 53 minutes." In doing this I call special attention to the passing of the signs over the cusps of the mundane houses, and also to the fact that this exact degree of the sign, Gemini, is at this exact hour just coming into view on the eastern horizon, and, having ascertained the ascendant, a glance at the mechanism shows all the other signs to be in perfect alinement with the other mundane houses, Gemini being 28 degrees and 53 minutes ascendant and the other signs and houses being as follows:

Taurus, 20 degrees, holding the cusp of the twelfth house;

Aries, 8 degrees, holding the cusp of the eleventh house;

Pices, 5 degrees, holding the cusp of the tenth house;

Aquarius, 10 degrees, holding the cusp of the ninth house;

Capricorn, 19 degrees, holding the cusp of the eighth house;

Sagittarius, 28 degrees, holding the cusp of the seventh house;

Scorpio, 20 degrees, holding the cusp of the sixth house;

Libra, 8 degrees, holding the cusp of the fifth house;

Virgo, 5 degrees, holding the cusp of the fourth house;

Leo, 10 degrees, holding the cusp of the third house;

Cancer, 19 degrees, holding the cusp of the second house.

I mark the above degrees holding the several cusps on the sign blackboards holding them.

I next refer again to my ephemeric to get the exact longitude of the planets, sun and moon for the aforesaid time. This, for the sun, I find to be 8 degrees and 28 minutes in the sign, Aries, at noon on March 29, 1916. But I must get this longitude for 10 o'clock a. m. on that day. By comparing the longitude of the sun at noon for the several days of the aforesaid month of March it is found that its relative motion or variation in 24 hours is 59 minutes and 16 seconds. By a simple calculation, said motion or variation is found to be about 5 minutes in 2 hours. Subtracting this 5 minutes from its noon longitude, 8 degrees and 28 minutes, we have 8 degrees and 23 minutes as the sun's exact longitude at 10 o'clock a. m., March 29, 1916.

I now place the golden colored crystal representing the sun on the 5th circle near the cusp of the eleventh house, for, the sun at the aforesaid time being in Aries, by looking at the mechanism, the sign blackboard, Aries, is seen to hold that house by 8 degrees.

I now write on board N, Fig. 9, in the horizontal space allotted to the significator (symbol) of the sun, in the vertical half-section headed "position," in the vertical column headed "Cel," 8 degrees and 23 minutes. In the next column to the right, headed "Mun," I write the number 11, said board now reading from left to right and from top to bottom, "Sun in 8 degrees and 23 minutes of Aries," the first celestial sign, now occupying the position of the eleventh celestial sign by holding the eleventh mundane house.

In using the celestial chart, Fig. 5, instead of that of Fig. 13, in private work, I do for the sake of convenience position the planets first, beginning with Neptune, the planet having the largest orbit.

By a similar method employed as aforesaid for positioning the sun at the time aforesaid and of recording the facts obtained thereby, I now position the moon and all the planets, and in this way build up and erect a complete and exact map of the heavens for the aforesaid time. Having done this, I proceed to work out the distances of the planets one from another which, as aforesaid, I call "aspects," and also their declinations to the ecliptic, and I write all of these facts in their proper places on board O, Fig. 9.

Thus it is seen, by means of my mechanism, I not only have before me a complete and exact map of the heavens for the time aforesaid, but also the two boards N and O on which are recorded all the necessary facts deduced from said map and in a condensed form peculiarly adapted to enable me to reach correct conclusions with regard to the three great cosmic factors, namely, the spiritual nature, the mental nature and the physical nature of man.

I will now explain how I use my mechanism in teaching scriptural truths. By way of illustration, I will now treat chronologically of Noah's flood. Taking my mechanism as arranged and described next above, I first remove all of the crystals and turn the celestial chart, Fig. 13, back to a radical position. I read Genesis 7; 11, and explain by other scriptures the condition of the earth and heavens before this event. I also bring astronomical science to my aid as proof of the word (fact) that "the Lord God had not caused it to rain upon the earth." Gen. 2; 5–6. I now read verses 1–7, Gen. 7, to prove that Noah and his family entered the ark on the 10th day of the "second month." I next proceed to establish the exact date of this event by calling attention to the dates found in the fifth chapter of Genesis, and in this way determine that the 600th year of Noah's life was the 1656th year from the creation of man. I next proceed to define the "second month" aforesaid by referring to Exodus 12; 1: 2; 18: and 13; 4. I now call attention to the ordinary calendar months of Fig. 4; also to the Hebrew calendar of the same figure; and also to the zodiacal signs, Fig. 13, set in radical position, proving that the aforesaid "second month" was the second ecclesiastical month or the eighth civil year month of the Hebrew calendar corresponding to April—May of the ordinary calendar and to the second zodical sign, Taurus. So that my chronology is, according to the ordinary calendar, May 1, 1656, a. m.; according to the Hebrew ecclesiastical year Iyar 10, 1656; according to astronomical calculation the 10th degree of the second zodical sign, Taurus, which, by the mechanism, is the 40th degree of the solar cycle and the beginning of the second decan of said sign, Taurus.

I now call attention to said decan by referring to the zodiac, Fig. 3, where it is pictured as a great stream of water called Eridanus, meaning waters of judgment. Thus it is, the flood beginning on the "seventeenth day of the month" (Gen. 7; 11), the mechanism now shows that said day was the 47th degree of the solar cycle and the 17th degree of the sign, Taurus, or about the middle of the second decan of said sign, which decan is Eridanus, that is "waters of judgment."

I now read from Genesis 7; 12, that "the rain was upon the earth forty days and forty nights." I now refer to the degrees marked on the rim of Fig. 4 counting from the 47th degree on said rim as the beginning of rain. To this I add 40 degrees for the continuance of the rain and find that the rain ceased on the 27th day of the 3d Hebrew ecclesiastical month which is the 9th civil month called Sivon, which corresponds to the 87th degree of the solar cycle or the 20th day of June (summer solstice) of the ordinary calendar, which, astronomically considered, is the 27th degree of the third zodiacal sign, Gemini, which falls on the third decan of said sign called Procyon. By referring to the zodiac, Fig. 3, it is seen that the decan Procyon is pictured as a little dog the companion of the great dog Sirius, the second decan of said sign, which dog Sirius is called the avenger. Psa. 149; 7–9.

By referring now to Gen. 7; 24, we see that "the waters prevailed upon the earth an hundred and fifty days." I now begin at the 47th degree marked on the rim of Fig. 4 and count 150 degrees (five months) which brings us to the 17th day of the seventh Hebrew ecclesiastical month (Gen. 8; 4) or the first month of the Hebrew civil year, corresponding to the 25th day of October of the ordinary calandar, which, astronomically considered, is the 17th degree of the seventh zodiacal sign, Libra, which falls on the second decan of said sign. By referring again to zodiac, Fig. 3, we see that this decan is pictured as a dead wolf and is called "the victim slain," an appropriate symbol of a slain world. Gen. 7; 23.

By referring now to Gen. 8; 5, we see that "the waters decreased continually until the tenth month: in the tenth month, on the first day of the month, were the tops of the mountains seen." I now begin at the 197 degree marked on the rim of Fig. 4 and count 73 degrees or days to the 1st day of the 10th Hebrew ecclesiastical month or the 4th Hebrew civil month, corresponding to the 9th day of January of the ordinary calendar, which, astronomically considered, is the first degree of the tenth zodiacal sign, Capricorn, which falls on the first decan of said sign. By referring again to the zodiac, Fig. 3, we see that this decan is pictured by a flying arrow called the killing dart, a fitting symbol of the universal death that had covered the mountain tops and reached even to the "fowl of the heaven." Gen. 7; 23. Forty days later Noah opens the window, sends forth the raven that "returned not" and the dove which "returned again". Beginning at the 270th degree marked on the rim of Fig. 4, I count 40 degrees which brings me to the 310 degree of the solar cycle or the 10th day of the eleventh Hebrew ecclesiastical month or the fifth Hebrew civil month, corresponding to the 20th day of February of the ordinary calendar, which, astronomically considered, is the 10 degrees of the eleventh sign, Aquarius, which falls on the cusp of the second decan of said sign, called Pegasus. By referring again to the zodiac, Fig. 3, we see that this decan is pictured as a "winged horse" speeding swiftly, star names, meaning the issuing forth, a remarkable symbol of the sending forth of the spirit as spoken of by Zachariah, 6th chapter, and in Revelations, 6th chapter, 7 days later, which brings me to the 317th degree of the solar cycle or 17 days of the eleventh Hebrew ecclesiastical month, or the fifth Hebrew civil month, corresponding to February 27th of the ordinary calendar, which, astronomically considered, is the 17th degree of the eleventh zodiacal sign, Aquarius, which falls on the second decan (not the cusp of) of said sign called Pegasus, the winged horse (as explained above), Noah again sent forth the dove which returned in the evening bearing the sign of natural life, "the olive leaf plucked off." Noah remain in said ark still another 7 days and sent forth the dove the third time, and it returned no more. Beginning at the 317th degree marked on the rim of Fig. 4 and counting 7 degrees, I come to the 324 degree of the solar cycle, or the 24th day of the Hebrew ecclesiastical month, or the fifth Hebrew civil month, corresponding to March the 5th or 6th of the ordinary calendar, which, astronomically considered, is the 24th degree of the eleventh zodiacal sign, Aquarius, which falls on the third decan of said sign, called Cygnus. By referring again to the zodiac, Fig. 3, we see that this decan is figured as a great bird flying swiftly down the milky way, said bird being called also the swan which is a very important constellation in astronomical calculations, the principal stars of which form the most symmetrical cross in the heavens, a fitting picture of the sending forth of the Spirit to the whole earth, as foretold in Joel and referred to in Acts 2; 16-21.

I now read the 13th verse of the 8th chapter of Genesis, which shows that, after the end of the last seven days aforesaid, Noah remained in the ark 36 days or until "the waters were dried up from off the earth," which was in "the six hundredth and first year, in the first month, the first day of the month." Beginning at the 324th degree marked on the rim of Fig. 4, I count 36 degrees which brings me to the 361 degree of the solar cycle (one day more than a year), or the 1st day of the first Hebrew ecclesiastical month or the seventh Hebrew civil month, corresponding to the 10th day of April of the ordinary calendar, which, astronomically considered, is the 1st degree of the first sign, Aries, the point of the vernal equinox that determines the radical position of the zodiac and so brings the astronomical year, the divinely appointed "New Year's day" of the Hebrews. Exodus 12; 2:13; 4.

As Noah on this day "removed the covering of the ark", so it became a fitting time to remove the covering of the old dispensation or "world that was" and let in the sun light of the new era, when the lamb shall lead instead of the bull. St. John 1; 29. This 1st day of this sign, Aries, falls on the first decan of the sign, called Cassiopeia. By referring again to the zodiac, Fig. 3, we see that this decan is pictured as a queen receiving the sign of favor from the enthroned King, Cepheus, the second decan of the neighboring sign, Pices, who is holding out to her the scepter—a beautiful and fitting picture of the great mother earth, cleansed and purified by the "waters of judgment"— restored to favor with her King and Creator and never again to be "cursed for man's sake" or smitten by a universal death (Gen. 8; 21), "and in the second month, on the seven and twentieth day of the month, was the earth dried. And God spake unto Noah, saying, go forth, etc." Gen. 8:14-16.

As we said before, by reference to the fifth chapter to Genesis, we learn that Noah was born in the 1056th year of creation, was 600 years, 2 months and 17 days old when "all the fountains of the great deep broke up," (Gen. 7; 11), was in the ark 1 year, 2 months and 17 days, and, therefore, beginning at the first degree of the first zodiacal sign, Aries, and counting 57 degrees, we find that he came out of the ark on the 27th day of the 2d month of the 1657th year of creation, which was the second month of the Hebrew ecclesiastical year or the eighth month of the Hebrew civil year, corresponding to May 17th of the ordinary calendar, which, astronomically considered, is the 27th degree of the second zodiacal sign, Taurus, which day falls on the third decan of said sign.

By referring again to the zodiac, Fig. 3, we see that this decan called Auriga is pictured as the Good Shepherd who is holding the lambs and ewes in his arms. Isa. 40; 9-11.

Thus, in this decan of the peaceful shepherds, ends this great cataclysm, which lasted 365 plus 10, equal 375, days sun measurement, or 360 plus 10, equals 370, days moon or scriptural measurement—a period of time in which there was neither "seed time or harvest"—but a shoreless ocean tumbled around the globe and earth received her universal baptism unto death, a calamity which shall never occur again. Gen. 8; 22.

The birth of Christ occurred 4100 A. M. Subtracting from that number 1657, we find the flood ended 2443 B. C. By adding to this last number 1916 (this current year), we find, according to Bible chronology, that Noah came out of the ark exactly 4359 years ago on this 17 day of May, 1916, the day on which this manuscript is written, and, to complete the chronology, add 1657 to 4359 and find that we are in the 6016 year since the creation of Adam.

Having thus explained my invention as a working mechanism as it pertains to the erection of maps of the heavens and to the teaching, elucidating and demonstrating of scriptural truths, I could proceed in like manner to treat of religion, psychology, astronomy, meteorology, astrology, polarization, orientation, sacred chronology, metaphysics and gemology, all pertaining chiefly to man's spiritual nature; and to treat of mental science, phrenology, physiognomy, palmistry, mathematics (mensuration and longitude and time), geography (astronomical, political and physical), all pertaining to the mental nature of man; and also to treat of craniology, hygiene, somatology (anatomy, physiology and biology apart from psychology), medical science, chemistry, geology and physics all pertaining to the physical nature of man.

In doing this, I treat of various branches of human knowledge bearing upon and referable to all of the aforesaid divisions of man, the great microcosm, such as the Holy Scriptures (already illustrated), history, sociology, human science, anthropology, biology (including psychology), rational and scientific diagnosis and body treatment (including medicine properly applied) and chromeology.

Having thus described my invention in detail, by illustrations and as a working mechanism,

What I claim is:—

1. In means for demonstrating stellar positions and influences, a chart having placed thereon a figure consisting of any suitable number of concentric circles having a common center, a human head at the common center of said circles, a human figure in circular formation encompassing said human head, said circles having 12 radii numbered from 1 to 12 inclusive dividing said human head, said human figure and each of said circles into approximately 12 equal segments, radius 1 lying at the head and feet, radius 4 at the chest, radius 7 at the reins, and radius 10 at the knees, of said human figure, degree marks placed on one of said circles, a square cornering at radii 1, 4, 7 and 10, and words and symbols written on the circumferences of said circles denoting the months of the Hebrew ecclesiastical and civil year and also of the ordinary year, political divisions of the earth, characteristics of human nature, ante-diluvians Israelites, Christ's apostles, jewels, colors, symbols of the signs of the zodiac, and on said human head faculties of the human mind, and on said human figure the various organs and portions of the human body.

2. In means for demonstrating stellar positions and influences, a wheel consisting of a rim, 6 diameters, 12 sign blackboards and a square, said rim being adapted to be knocked down into 6 approximately equal sections which in their turn are divided by means of flange-like elevations on, and perforations through, said rim into 6 approximately equal parts, said diameters being adapted to intersect each other at the center of said wheel thereby dividing themselves into 12 radii the free end portions of which are adapted to be detachably attached to said rim at points approximately equidistant the one from the other on said rim, said points of attachment on said radii being between the free ends thereof and the center of said wheel, said sign blackboards having placed thereon the illuminated, colored pictures, symbols and names of the signs of the zodiac and scriptural references pertaining to said signs, which blackboards are adapted to being detachably attached to the free ends of said radii, said square cornering at Taurus, Leo, Scorpio and Aquarius, said rim having placed thereon the names of the decans of said signs and scriptural references pertaining thereto, said radii having placed thereon the symbols of the signs of the zodiac and the abbreviations of various names, namely, names of the sun, moon, planets, the various characteristics of said signs, aspects, positions, degrees of color, and the various mundane houses.

3. In means for demonstrating stellar positions and influences, a wheel consisting of a rim, 6 diameters, 12 sign blackboards, a square and any suitable number of concentric circles of tubing, said rim being adapted to be knocked down into 6 approximately equal sections which in their turn are divided by means of flange-like elevations on, and perforations through, said rim into 6 approximately equal parts, said diameters being adapted to intersect each other at the center of said wheel thereby dividing themselves into 12 radii the free end portions of which are adapted to be detachably attached to said rim at points approximately equidistant the one from the other on said rim, said points of attachment on said radii being between the free ends thereof and the center of said wheel, said sign blackboards having placed thereon the illuminated, colored pictures, symbols and names of the signs of the zodiac and scriptural references pertaining to said signs, which blackboards are adapted to being detachably attached to the free ends of said radii, said square cornering at Taurus, Leo, Scorpio and Aquarius, said concentric circles of tubing being held and secured together and at suitable distances apart by angular braces to one edge of which said tubing are securely attached, the opposite edges of said braces having thereon lugs adapted to slide under and catch upon the edges of said sign blackboards and hold said tubing thereon, said circles of tubing being adapted to be knocked down into 4 approximately equal sections of as many individual pieces of tubing as are held together by said braces, said rim having placed thereon the names of the decans of said signs and scriptural references thereto, said radii having placed thereon the symbols of the signs of the zodiac and the abbreviations of various names, namely, names of the sun, moon, planets, the various characteristics of said signs, aspects, positions, degrees of color, and the various mundane houses, said circles of tubing being adapted to receive thereon and at any suitable point thereon any suitable number of movable, illuminated, colored crystals representing various heavenly bodies.

4. In means for demonstrating stellar positions and influences, primary disk-tipped arms having disks attached to one of their ends and perforations through the other, except as to one arm which has a hand-pointer attached to one end thereof instead of a disk, said perforations being adapted to aline one with another and to receive a spindle therethrough adapted to bind and secure said perforated ends together, upon which spindle said arms are adapted to rotate, some of said arms having attached thereto at suitable points between the ends thereof secondary disk-tipped arms, said disks on said primary arms having placed thereon the names and symbols of the planets, sun, moon, certain stars, and of said hand-pointer, and said disks on said secondary arms representing moons of said planets do not, on that account, have any names or symbols thereon.

5. In means for demonstrating stellar positions and influences, a chart having placed thereon a human hand and concentric circles overlying said hand, said circles having a common center at the center of the palm of said hand, the largest of said circles encompassing the wrist and touching upon the tips of the four fingers of said hand, said circles having 6 diameters adapted to intersect each other at said common center and thereby dividing themselves into 12 radii dividing said circles and said hand into approximately 12 equal sections, four of said radii running along the axes of the four fingers of said hand, the end and the end portion of the thumb of said hand lying between two other of said radii, one of said last mentioned radii being half of the diameter dividing said hand into approximately two equal parts, one part including approximately one half of the palm of said hand, the four fingers and approximately one half of the thumb of said hand, the other part including the other part of said palm, the other portion of said thumb and the wrist of said hand, said diameter running along the middle finger of said hand intersecting said last mentioned diameter at approximately right angles and dividing said hand into approximately two equal parts the other way, one of said parts including approximately half of the wrist, the palm, and middle finger of said hand and all of the third (ring) and fourth (little) finger of said hand, the other part including the other part of the wrist, the palm and the middle finger of said hand and all of the index finger and thumb of said hand, on the circumferences of said circles are written for comparison certain natural characters found in the human hand and similar appearing astronomical characters denoting planetary aspects, numerals indicating the number of degrees required to form an aspect, symbols of the signs of the zodiac in radical position, astronomical symbols of the sun, moon, planets and asteroids placed in sections and signs agreeable thereto, human hand characters in alinement with said signs and symbols, and words naming the lines commonly found in the human hand.

6. In means for demonstrating stellar positions and influences, a time indicator consisting of a circular rim to which are attached by any suitable means 6 diameters adapted to intersect each other at the center of said circular rim, said diameters having at said central point a common perforation dividing them into 12 radii which in their turn divide said rim into approximately 12 equal sections having placed thereon at their central point the ordinary numerals 1, 3, 5 and so on to and including 23, and at the points of intersection with said radii the ordinary numerals 2, 4, 6 and so on to and including 24, said numerals following each other on said rim in the regular order 1, 2, 3, and so on, said radii being longer than the distance from the center of said circular rim to the larger circumference thereof, their free ends extend for a short distance beyond said rim, to which free ends are attached by any suitable means, number boards on which are placed the Roman numerals I, II, III and so on to and including XII, said Roman numerals alining radially with said ordinary numerals I with 2, II with 4, III with 6 and so on to and including XII with 24, said indicator having also 4 pointers having perforations through their larger ends adapted to aline one with another and with said common perforation through said diameters, said alining perforations being adapted to receive and be mounted on a spindle on which said pointers are adapted to rotate, two of said pointers being adapted to point to and indicate said Roman numerals and points therebetween, and the other two of said pointers which are shorter than said first mentioned pointers are adapted to point to and indicate said ordinary numerals, said Roman numerals indicating solar time and said ordinary numerals indicating sidereal time.

7. In means for demonstrating stellar positions and influences, a blackboard divided vertically by any suitable means into two approximately equal portions, one portion being headed "Declination," and the other portion "Positions," said first mentioned portion being subdivided vertically into four smaller portions headed "Po," "No," "So" and "Parl," said last mentioned portion being divided vertically into four smaller portions headed "Po," "Cell," "Mun" and "Conc," said board being divided horizontally, other than as it pertains to the aforesaid headings, into nine portions headed laterally with the symbols of the sun, moon, and seven plants, Neptune, Herschel, Saturn, Jupiter, Mars, Venus and Mercury.

8. In means for demonstrating stellar positions and influences, a blackboard headed "Aspects" and divided horizontally into thirteen portions headed laterally with the symbols of the aspects, parallel, opposition, triangle, square, semi-square, sextile, semi-sextile, quintel, bi-quintel, sesqui-quadrate, eclipse, crescent and occult sign.

9. In means for demonstrating stellar positions, influences and in combinations; a tripod stand having detachably attached thereto a chart-pole and a spindle; a chart having placed thereon a figure called the mundane sphere, said chart being securely attached to said pole and detachably mounted on said spindle; a wheel called the celestial sphere rotatably mounted on said spindle, said wheel being adapted to make all desirable alinements with said mundane sphere; arms having attached thereto disks representing various heavenly bodies rotatably mounted on said spindle; and a nut run onto the threaded end of said spindle.

10. In means for demonstrating stellar positions and influences and in combination; a tripod stand having detachably attached thereto a chart-pole and spindle; a chart having placed thereon a figure called the mundane sphere, said chart being securely attached to said pole and detachably mounted on said spindle; a wheel called the celestial sphere rotatably mounted on said spindle, said wheel being adapted to make all desirable alinements with said mundane sphere; arms having attached thereto disks representing various heavenly bodies rotatably mounted on said spindle; a time indicator mounted on said spindle; and a nut run onto the threaded end of said spindle.

11. In means for demonstrating stellar positions and influences and in combination; a tripod stand having detachably attached thereto a chart-pole and a spindle; a chart having placed thereon a figure called the mundane sphere, said chart being securely attached to said pole and detachably mounted on said spindle; a wheel called the celestial sphere rotatably mounted on said spindle, said wheel being adapted to make all desirable alinements with said mundane sphere; concentric circles of tubing detachably attached to said wheel; movable, illuminated, colored crystals representing various heavenly bodies detachably attached to and at any point on said tubing; and a nut run onto the threaded end of said spindle.

12. In means for demonstrating stellar positions and influences and in combination; a tripod stand having detachably attached thereto a chart-pole and a spindle; a chart having placed thereon a figure called the mundane sphere, said chart being securely attached to said pole and detachably mounted on said spindle; a wheel called the celestial sphere rotatably mounted on said spindle, said wheel being adapted to make all desirable alinements with said mundane sphere; concentric circles of tubing detachably attached to said wheel; movable, illuminated, colored crystals representing various heavenly bodies detachably attached to and at any point on said tubing; a time indicator mounted on said spindle; and a nut run on the threaded end of said spindle.

13. In means for demonstrating stellar positions and influences and in combination; a tripod stand having detachably attached thereto a chart-pole and a spindle; a chart having placed thereon a figure called the mundane sphere, said chart being securely attached to said pole and detachably mounted on said spindle; a wheel called the celestial sphere rotatably mounted on said spindle, said wheel being adapted to make all desirable alinements with said mundane sphere; a chart having placed thereon a figure representing the human hand, said chart being adapted to make any desirable alinements with said mundane sphere, said celestial sphere or both; and a nut run onto the threaded end of said spindle.

14. In means for demonstrating stellar positions and influences and in combination; a tripod stand having detachably attached thereto a chart-pole and a spindle; a chart having placed thereon a figure called the mundane sphere, said chart being securely attached to said pole and detachably mounted on said spindle; a wheel called the celestial sphere rotatably mounted on said spindle, said wheel being adapted to make all desirable alinements with said mundane sphere; concentric circles of tubing detachably attached to said wheel; movable illuminated, colored crystals representing various heavenly bodies detachably attached to and at any point on said tubing; a chart having placed thereon a figure representing the human hand, said chart being adapted to make any desirable alinements with said mundane sphere, said celestial sphere or both; and a nut run onto the threaded end of said spindle.

15. In means for demonstrating stellar positions and influences, movable crystals in combination with concentric circles of tubing, said crystals consisting of translucent heads having springs attached thereto, said heads being of any suitable color and illuminated by any suitable means and having placed thereon the symbols of certain heavenly bodies represented by them, and such of said crystals as represent planets having placed thereon also numerals denoting the relative time required for the planet represented to make one revolution around the sun, said spring being in two parts, each part being similarly corrugated but in opposite directions, by which formation the free ends of said springs diverge thereby being adapted to slide onto said tubing at any point therealong, said spring at the half-way point between said free ends and said heads being adapted to receive and detachably clamp said tubing and hold said crystals thereon, said crystals functionally having six-fold natures, (1) to represent heavenly bodies, (2) to illustrate relative sizes thereof, (3) to illustrate relative distances from the sun, (4) to represent element colors, (5) to give the number of satellites thereof, and (6) to give relative number of revolutions around the sun.

In testimony whereof I have hereunto set my hand in presence of two subscribing witnesses.

GENEVIEVE PRICE EVERSON.

Witnesses:
A. T. HART,
THOMAS V. MAXEDON.

Copies of this patent may be obtained for five cents each, by addressing the "Commissioner of Patents, Washington, D. C."